(12) United States Patent
Bonici et al.

(10) Patent No.: US 11,707,084 B2
(45) Date of Patent: Jul. 25, 2023

(54) ACTIVATED CARBON BEADS FOR SMOKING ARTICLES

(71) Applicant: PHILIP MORRIS PRODUCTS S.A., Neuchatel (CH)

(72) Inventors: Alberto Bonici, Modena (IT); Gaetan Couderc, Peseux (CH); Angel Linares-Solano, Alicante (ES); Maria Angeles Lillo-Rodenas, Alicante (ES); Ana Amoros Perez, Alicante (ES); Laura Cano Casanova, Alicante (ES); Mohammed Ouzzine, Alicante (ES); Aroldo José Romero Anaya, Alicante (ES)

(73) Assignee: Philip Morris Products S.A., Neuchâtel (CH)

( * ) Notice: Subject to any disclaimer, the term of this patent is extended or adjusted under 35 U.S.C. 154(b) by 1390 days.

(21) Appl. No.: 15/745,221

(22) PCT Filed: Jul. 14, 2016

(86) PCT No.: PCT/IB2016/054218
§ 371 (c)(1),
(2) Date: Jan. 16, 2018

(87) PCT Pub. No.: WO2017/013549
PCT Pub. Date: Jan. 26, 2017

(65) Prior Publication Data
US 2018/0220700 A1    Aug. 9, 2018

(30) Foreign Application Priority Data

Jul. 17, 2015 (EP) .................................. 15177395

(51) Int. Cl.
*A24D 3/16* (2006.01)
*C01B 32/336* (2017.01)
(Continued)

(52) U.S. Cl.
CPC .............. *A24D 3/163* (2013.01); *A24C 5/474* (2013.01); *A24D 1/045* (2013.01); *A24D 3/02* (2013.01);
(Continued)

(58) Field of Classification Search
None
See application file for complete search history.

(56) References Cited

U.S. PATENT DOCUMENTS

2003/0131858 A1    7/2003  Patel
2004/0016436 A1    1/2004  Thomas
(Continued)

FOREIGN PATENT DOCUMENTS

CN    102933105 A    2/2013
CN    103271438 A    9/2013
(Continued)

OTHER PUBLICATIONS

Mironeasa et al. "Grape Seed: Physiochemical, structural characteristic and oil content", Journal of Agroalimentary Processes and Technologies 2010, 16 (1), 1-6 (Jan. 2010). (Year: 2010).*
(Continued)

*Primary Examiner* — Kelly M Gambetta
*Assistant Examiner* — Katherine A Will
(74) *Attorney, Agent, or Firm* — Mueting Raasch Group

(57) ABSTRACT

Smoking article include a smokable material and an activated carbon particle downstream of the smokable material. The activated carbon particle is produced from a whole seed. The activated carbon particle has a length, width and height. At least two of the length width and height are independently in a range from about 1 mm to about 7.5 mm. The particles can be spheroids, in which case the length, width and height would be the same or similar.

15 Claims, 2 Drawing Sheets

Figure 1:
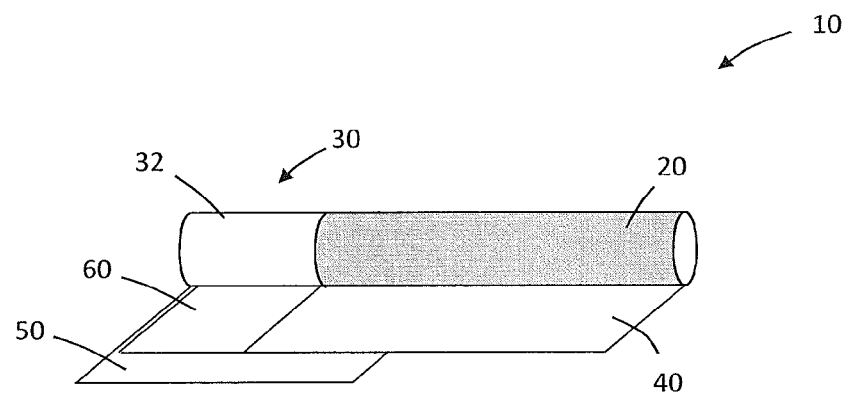

(51) Int. Cl.
| | |
|---|---|
| *A24C 5/47* | (2006.01) |
| *A24D 1/04* | (2006.01) |
| *A24D 3/02* | (2006.01) |
| *A24F 7/04* | (2006.01) |
| *B01D 53/02* | (2006.01) |
| *B01J 20/20* | (2006.01) |
| *B01J 20/28* | (2006.01) |
| *B01J 20/30* | (2006.01) |
| *C10B 49/02* | (2006.01) |
| *C10B 53/02* | (2006.01) |

(52) U.S. Cl.
CPC ............... *A24F 7/04* (2013.01); *B01D 53/02* (2013.01); *B01J 20/20* (2013.01); *B01J 20/28004* (2013.01); *B01J 20/28011* (2013.01); *B01J 20/28019* (2013.01); *B01J 20/28064* (2013.01); *B01J 20/28066* (2013.01); *B01J 20/3078* (2013.01); *B01J 20/3085* (2013.01); *C01B 32/336* (2017.08); *C10B 49/02* (2013.01); *C10B 53/02* (2013.01); *B01D 2253/102* (2013.01); *B01D 2253/304* (2013.01); *B01D 2253/306* (2013.01); *B01D 2253/34* (2013.01); *B01D 2257/408* (2013.01); *B01D 2257/502* (2013.01); *B01D 2257/7022* (2013.01); *B01D 2257/7027* (2013.01); *Y02E 50/10* (2013.01)

(56) References Cited

U.S. PATENT DOCUMENTS

| | | | |
|---|---|---|---|
| 2005/0066984 A1* | 3/2005 | Crooks | A24D 3/166 131/342 |
| 2014/0123991 A1 | 5/2014 | Fujita et al. | |
| 2016/0128294 A1* | 5/2016 | Nordskog | A24D 3/041 800/317.3 |

FOREIGN PATENT DOCUMENTS

| | | |
|---|---|---|
| CN | 103763949 A | 4/2014 |
| EP | 2630879 A1 | 8/2013 |
| JP | H08-037817 A | 2/1996 |
| JP | H08215294 A | 8/1996 |
| WO | WO 03/71886 A1 | 9/2003 |
| WO | WO 2006/082529 A2 | 8/2006 |
| WO | WO 2009/080368 A1 | 7/2009 |
| WO | WO 2010/103323 A1 | 9/2010 |
| WO | WO 2011/140430 A1 | 11/2011 |
| WO | WO 2012/138630 A1 | 10/2012 |

OTHER PUBLICATIONS

Linares-Solano et al., "Further advances in the characterization of microporous carbons by physical adsorption of gases," *Tanso*, 1998;185:316-325.

Otake and Jenkins, "Characterization of oxygen-containing surface complexes created on microporous carbon by air and nitric acid treatment," *Carbon*, 1993;31:109-121.

Roman-Martinez et al., "TPD and TPR characterization of carbonaceous supports and Pt/C catalysts," *Carbon*, 1993;31:894-902.

Romero-Anaya et al., "Spherical activated carbon for low concentration toluene adsorption," *Carbon*, 2010;48:2625-2633.

Zielge et al., "Surface oxidized carbon fibers: I. Surface Structure and Chemistry," *Carbon*,1996;34:983-998.

International Search Report and Written Opinion for PCT/IB2016/054218, issued WIPO, dated Nov. 3, 2016; 10 pgs.

International Preliminary Report on Patentability for PCT/IB2016/054218, issued by the European Patent Office, 11 pgs.

Chinese Office Action issued for CN Application No. 201680036663.6, issued by the China National Intellectual Property Administration dated Feb. 6, 2020; 22 pgs. including English Translation.

Second Office Action issued by the China National Intellectual Property Administration for CN 201680036663.6; dated Aug. 31, 2020: 21 pgs.

Office Action issued by the Japanese Patent Office for JP 2017-567155; dated Aug. 3, 2020; 10 pgs.

Lillo-Rodenas et al., "Behaviour of activated carbons with different pore size distributions and surface oxygen groups for benzene and toluene adsportion at low concentrations," *Carbon*, 2005;43:1758-1797.

* cited by examiner

ACTIVATED CARBON BEADS FOR SMOKING ARTICLES

This application is the § 371 U.S. National Stage of International Application No. PCT/IG2016/054218, filed 14 Jul. 2016, which claims the benefit of European Application No. 15177395.9, filed 17 Jul. 2015.

This disclosure relates to smoking articles that have filters containing activated carbon.

Combustible smoking articles, such as cigarettes, typically have shredded tobacco (usually in cut filler form) surrounded by a paper wrapper forming a tobacco rod. A cigarette is employed by a smoker by lighting one end of the cigarette and burning the tobacco rod. The smoker then receives mainstream smoke by drawing on the opposite end or mouth end of the cigarette, which typically contains a filter. The filter is positioned to entrap some constituents of mainstream smoke before the mainstream smoke is delivered to a smoker.

A number of smoking articles in which an aerosol generating substrate, such as tobacco, is heated rather than combusted have also been proposed in the art. In heated smoking articles, the aerosol is generated by heating the aerosol generating substrate. Known heated smoking articles include, for example, smoking articles in which an aerosol is generated by electrical heating or by the transfer of heat from a combustible fuel element or heat source to an aerosol generating substrate. During smoking, volatile compounds are released from the aerosol generating substrate by heat transfer from the heat source and entrained in air drawn through the smoking article. As the released compounds cool they condense to form an aerosol that is inhaled by the consumer. Also known are smoking articles in which a nicotine-containing aerosol is generated from a tobacco material, tobacco extract, or other nicotine source, without combustion, and in some cases without heating, for example through a chemical reaction. Such non-combustible smoking articles may also include a filter positioned to adsorb smoke constituents before the mainstream smoke is delivered to a user.

Filters in smoking articles, whether combustible or non-combustible, may contain activated carbon to remove selected constituents from smoke.

Activated carbon granules or spheronized activated carbon are typically used in filters to selectively adsorb smoke constituents. Activated carbon powder is not used because its size is too small to be retained by filter material such as cellulose acetate tow. However, filters containing activated carbon granules or spheres still tend to suffer from particle breakthrough, which occurs when particles of activated carbon are released from the filter and enter the smoker's mouth as a smoker draws on the mouth end of a smoking article. In part, particle breakthrough can be attributed to the process by which activated carbon is produced. Activated carbon is typically produced by carbonizing and activating a carbon-containing polymer or a vegetal source of carbon, such as coconut shells, and then granulating or crushing. Activated carbon powders or granules can be spheronized through the use of a binder or can be extruded. Activated carbon compositions containing the resulting granules, spheres, or extruded material can include small particles that lead to breakthrough.

In addition, particle breakthrough can arise from processing of filters containing activated carbon or from incorporation of such filters into smoking articles. For example, continuous rods of filter having activated carbon can be cut into smaller segments for incorporation into smoking articles on a smoking article manufacturing line, and cutting of a filter containing activated carbon can result in freeing of previously entrapped activated carbon particles.

One object of the present invention is to manufacture activated carbon for use in smoking articles, where the activated carbon exhibits less particle breakthrough during smoking than with current smoking articles that employ activated carbon. Another object of the present invention is to simplify the process for manufacturing activated carbon for use in smoking articles. Other objects of the present invention will be evident to those of skill in the art upon reading and understanding the present disclosure, which includes the claims that follow and accompanying drawings.

In various aspects of the present invention, a smoking article includes a smokable material and an activated carbon particle downstream of the smokable material. The activated carbon particle has a length, width and height. At least two of the length width and height are independently in a range from about 1 mm to about 7.5 mm. Preferably, the particles have an ellipsoid shape, such as a spheroid shape in which case the length, width and height would be the same or similar. Preferably, the activated carbon particle is formed from a biological material having a size and shape similar to the resulting activated carbon particle. In preferred embodiments, the biological material is a seed. Preferably, the seed is a whole seed, and the activated carbon particle is produced by carbonizing and activating the whole seed. Thus, one seed can produce one activated carbon particle.

In preferred aspects of the present invention, a smoking article includes a smokable material and an activated carbon particle downstream of the smokable material. The activated carbon particle is produced from a seed. The activated carbon particle has a length, width, and height. At least two of the length, the width and the height are independently in a range from 1 mm to 7.5 mm.

As used herein, a "smokable material" is a material that generates an aerosol deliverable to a user of a smoking article when the material is placed in a smoking article and the smoking article is properly employed by a user.

In various aspects of the present invention, a method for manufacturing a smoking article includes treating a material to form an activated carbon particle and incorporating the activated carbon particle material into the filter. The material consists essentially of a biological material having length, width and height. At least two of the length, width and height are independently in a range from about 1 mm to about 10 mm.

Various aspects of the smoking articles and methods of the present invention may have one or more advantages relative to currently available smoking articles that include activated carbon or associated methods for manufacturing such smoking articles. For example and as described in the present disclosure, millimeter-sized activated carbon particles can be created without additional processing steps such as spheronization or extrusion. By way of another example, millimeter sized activated carbon particles can be created without the use of binder. As yet another example, particle breakthrough can be reduced due to the lack of a requirement for crushing or granulation steps in the production of the activated carbon. In addition, it has been found that natural biological precursors can be used to create activated carbon particles having suitable hardness for use in filters for smoking articles and the manufacture of such filters and smoking articles containing such filters. Further, a filter can contain a single activated carbon particle, which can avoid the use of filter combiners typically employed for making filters that include activated carbon. Carbon carry over may be reduced due to the use of a single or small number of activated carbon particle rather than a large number of activated carbon particles according to typical filter manufacturing processes. The activated carbon particles can also advantageously serve as a vehicle for delivery of flavorants in smoke of a smoking article. The activated carbon particles may also act as a flow restrictor in smoking articles due to the relatively large size of the particle. In addition, the activated carbon particles can serve to reduce the concentration of certain smoke constituents from mainstream smoke. Additional advantages of one or more aspects of smoking articles described herein will be evident to those of skill in the art upon reading and understanding the present disclosure.

Any suitable source material can be used to form an activated carbon particle having a length, width and height, where at least two, and preferably all three, of the length, width and height are independently in a range from about 1 mm to about 7.5 mm. Within these ranges of dimensions, the source material can have any suitable shape and size. Preferably, the activated carbon particle is produced from the source material without granulating, pulverizing or otherwise reducing the size of the source material or resulting carbonized or activated particle prior to or after carbonization. Preferably, the activated carbon is produced from the source material without increasing the size of the source material, by for example agglomerating particles prior to or after carbonization or carbonization and activation. Accordingly, a resulting activated carbon particle is derived from a single source material particle. As such, the source material and the resulting activated carbon particle have the same or similar shapes and sizes.

For example, the activated carbon particle carbon particles can have sizes that are in a range from about 40% to about 100% of the sizes of the source material from which the activated carbon particle was generated. While the invention does not involve mechanically disrupting the whole particle, the size of the particle may be reduced from during the carbonization and activation process. In some preferred embodiments, activated carbon particle carbon particles can have sizes that are in a range from about 50% to about 100% of the sizes; preferably from about 60% to about 100%, more preferably from about 70% to about 100%, even more preferably from about 80% to about 100%, of the source material from which the activated carbon particle was generated The source material can have any suitable length, width and height. Preferably, the source material is selected such that the resulting activated carbon particle has at least two of the dimensions, such as width and height, similar to or less than the corresponding dimensions of a smoking article into which the activated carbon particle is expected to be inserted. In preferred embodiments, the source material has a length in a range from about 1 mm to about 10 mm. In preferred embodiments, the source material has a width in a range from about 1 mm to about 10 mm. In preferred embodiments, the source material has a height in a range from about 1 mm to about 10 mm. Preferably, at least two of the length, width and height are independently in a range from about 1 mm to about 10 mm; more preferably in a range from about 2 mm to about 8 mm. More preferably, all three of the length, width and heights are independently within a range from about 1 mm to about 10 mm; more preferably in a range from about 2 mm to about 8 mm.

Preferably, the source material has an ellipsoid shape. For example, the source material can be a spheroid. In such embodiments, the length, width and height of the source material will be the same or similar.

Preferably, the smallest of the length, width and height of the source material is in a range from about 70% to about 99.9% of the largest of the length, width and height of the source material. More preferably, the smallest of the length, width and height is in a range from about 80% to about 99.9% of the largest of the length, width and height. Even more preferably, the smallest of the length, width and height is in a range from about 90% to about 99.9% of the largest of the length, width and height.

Preferably, the source material is a biological material. Preferably, the size of the biological source material is an unaltered natural size of the biological material. For example, the biological material, in its natural state, preferably is of a size described above for a source material.

Preferably, the biological material consists essentially of, or consists of, is a seed. Examples of seeds that have preferred sizes and shapes for generation of activated carbon particles include, but are not limited to, achira seeds such as *Canna indica* seeds, amapola or poppy seeds such as *Papaver rhoeas* seeds, amaranto or amaranth seeds such as *Amarantus hypochondriacus* seeds, mijo or millet seeds such as *Panicum miliaceum* seeds, mostaza or mustard seeds such as *Sinapis alba* seeds, pimiento negra or black pepper seeds such as *Piper nigrum* seeds, palmera or palm seeds such as *Phoenix dactylifera* seeds, aladierno seeds such as *Rhamnus alaternus* seeds, bayon seeds such as *Osyris lanceolate* seeds, ginebre or juniper seeds such as *Juniperus oxycedrus* seeds, Sabina seeds such as *Juniperus phoenicea* seeds, and falsa pimiento or false pepper seeds such as *Schinus molle* seeds.

Activated carbon can be produced from any suitable carbonaceous source material such as seeds. Activated carbon is a generic term used to describe a family of carbonaceous adsorbents with an extensively developed internal pore structure.

Activated carbon may be produced by any suitable process such as physical activation or chemical activation. In physical activation, the source material is developed into activated carbon by carbonization and activation with hot gases. The process of carbonization includes pyrolyzing source material at high temperatures, typically in the range of about 600° C. to about 900° C., in the absence of oxygen. Activation includes exposing carbonized material to oxidizing atmospheres, such as steam, carbon dioxide or oxygen, at temperatures above 250° C., such as about 800° C. Temperatures for activation/oxidization typically range from about 600° C. to about 1200° C., such as about 850° C.

Chemical activation includes impregnating raw source material with certain chemicals, such as an acid, base or salt, such as phosphoric acid, potassium hydroxide, sodium hydroxide, calcium chloride, or zinc chloride. The raw materials are then carbonized at temperatures that are typically lower than physical activation carbonization. For example, temperatures for chemical activation carbonization may be in the range of from about 450° C. to about 900° C. Carbonization and activation may occur simultaneously.

For purposes of the present disclosure, carbonaceous source material may be activated via any suitable process. Preferably, activation occurs in a step following carbonization. Preferably, carbonized particles are activated by a physical activation process.

Any suitable rate of heating can be used in a carbonization or activation process. In some embodiments, temperature is increased at a rate of about 5° C. per minute or about 10° C. per minute until the desired temperature is achieved during carbonization. The rate of temperature increase can be lower, such as about 1° C. per minute, to prevent agglomeration of particles during carbonization if needed or desired. In some embodiments, the rate of temperature increase in an activation process is about 5° C. per minute.

Pore size and surface characteristics may be varied according to well-known techniques, which can affect the efficiency with which activated carbon can remove selected smoke constituents, such as 1,2-propadiene, 1,3-butadiene, isoprene, benzene, 1,2-pentadiene, 1,3-cyclopentadiene, 2,4-hexadiene, 1,3-cyclohexadiene, methyl-1,3-cyclopentadiene, benzene, toluene, p-xylene, m-xylene, o-xylene, styrene (vinyl benzene), 1-methylpyrrole, formaldehyde, acetaldehyde, acrolein, propionaldehyde, isobutyraldehyde, 2-methyl isovaleraldehyde, acetone, methyl vinyl ketone, diacetyl, methyl ethyl ketone, methyl propyl ketone, methyl 2-furyl ketone, hydrogen cyanide, acrylonitrile, carbon monoxide, and combinations thereof. The ability to control pore size distribution and surface characteristics, such as surface oxygen concentration, of activated carbon are well known in the art. See, for example, (i) WO 2010/103323 A1, entitled METHODS FOR INCREASING MESOPORES INTO MICROPOROUS CARBON; (ii) Lillo-Rodenas et al. (2005), Behaviour of activated carbons with different pore size distributions and surface oxygen groups for benzene and toluene adsorption at low concentrations, *Carbon* 43: 1758-1767; and (iii) Romero-Anaya, et al. (2010), Spherical activated carbon for low concentration toluene adsorption, *Carbon* 48:2625-2633. In general, the pore size distribution and surface characteristics can be readily modified by adjusting the activating atmosphere (e.g., $O_2$, $CO_2$ or steam) and the activation time and temperature. Further treatment, e.g. in an inert atmosphere, may be performed to modify surface oxygen content without modifying porosity. One of skill in the art may readily adjust activation parameters to achieve activated carbon particles for use in filters and smoking articles of the present invention.

The activated carbon particles for used in filters or smoking articles of the present invention preferably has a specific surface area (BET) of about 500 $m^2/g$ or greater. Generally, the activated carbon will have a BET of about 2500 $m^2/g$ or less. Preferably, the activated carbon has a BET in a range from about 1000 $m^2/g$ to about 2000 $m^2/g$.

The activated carbon particles for used in filters or smoking articles of the present invention preferably has a hardness suitable for processing in existing bead insertion systems. Preferably, the activated carbon particle has a ball-pan hardness of greater than about 95%. Ball pan hardness may be measured according to ASTM D3802-10, Standard Test Method for Ball-Pan Hardness of Activated Carbon (DOI: 10.1520/D3802-10). Ball-pan hardness may give an idea of how resistant activated carbon is to particle degradation, with activated carbon having greater ball-pan hardness tending to have increased resistance to attrition. Ball pan hardness is a widely used metric for establishing a measurable characteristic of an activated carbon that is related to dusting. In preferred embodiments, activated carbon particles for use in filters or smoking articles of the present invention has a ball pan hardness of about 96% or greater or 97% or greater. More preferably, activated carbon particles for use in filters or smoking articles of the present invention have a ball pan hardness of about 98%. It will be understood that activated carbon for use in filters or smoking articles of the present invention will generally have a ball pan hardness of less than 100%.

Activated carbon particles for use in filters or smoking articles of the present invention may have any suitable density. The density of the activated carbon particle will depend in part on the density of the source material and the carbonization and activation processes employed. Density can be determined by ASTM D2854-09 (2014), Standard Test Method for Apparent Density of Activated Carbon. Preferably, activated carbon for use in filters of smoking articles of the present invention has a density from about 0.35 $g/cm^3$ to about 0.65 $g/cm^3$. More preferably, activated carbon for use in filters of smoking articles of the present invention has a density from about 0.4 $g/cm^3$ to about 0.60 $g/cm^3$.

Activated carbon particles for use in filters or smoking articles of the present invention may be of any suitable mass. The mass of the activated carbon particle will depend in part on the mass of the source material and the carbonization and activation processes employed. Preferably, the activated carbon particles have a mass in a range from about 5 mg to about 100 mg; more preferably from about 10 mg to about 60 mg.

Activated carbon particles for use in filters or smoking articles of the present invention may be of any suitable shape or size. Typically, the activated carbon particle is between 75% and 100% of the size of the source material and has the same or similar shape as the source material. Because the resulting activated carbon particle has a similar size and shape to the source material, binders are not needed to maintain the shape of the activated carbon material. Preferably activated carbon particles according to the present invention are free of added binders; that is, activated carbon particles as described herein can exclude binders. This is in contrast to activated carbon material currently employed in smoking articles or smoking article filters, which require which require binders to maintain cohesion of the granules or powder in a desired shape. Accordingly, the activated carbon particles described in this disclosure can be produced in fewer steps than activated carbon material currently used in the smoking article industry.

In preferred methods of the present invention, activated carbon particles are produced from biological source materials, such as seeds, which have a size corresponding to their natural size, which means that the size of the biological material is not increased, such as through agglomeration, or decreased, such as by removing a portion, pulverizing, or the like. For example, a seed that is subjected to carbonization and activation is preferably a whole seed and not a portion removed from the whole seed and not an agglomeration of seeds. The size of the biological source material, such as a whole seed, can be selected so that the resulting activated carbon particle has a suitable size for use in a smoking article. As discussed above, carbonization, activation, or carbonization and activation can affect the size of the resulting activated carbon particle, with the resulting activated carbon particle often being of a smaller size than the starting biological material. Preferably, an activated carbon particle resulting from carbonization and activation of a natural sized biological source material is not granulated or pulverized. Accordingly, in preferred embodiments of a method consist of, or consist essentially of: (i) obtaining a natural sized biological material, such as a whole seed; (ii) optionally drying the natural sized biological material; (iii) carbonizing the natural sized biological material or the optionally dried material to obtain a carbonized particle; (iv) activating the carbonized particle; and (v) incorporating the carbonized particle in a smoking article.

An activated carbon particle of the present invention or for use in the present invention can have any suitable size and shape. For example, an activated carbon particle can have any suitable length, width and height. Preferably, the activated carbon particle has at least two of the dimensions, such as width and height, similar to or less than the corresponding dimensions of a smoking article into which the activated carbon particle is expected to be inserted.

In preferred embodiments, the activated carbon particle has a length in a range from about 1 mm to about 7.5 mm. In preferred embodiments, the source material has a width in a range from about 1 mm to about 7.5 mm. In preferred embodiments, the source material has a height in a range from about 1 mm to about 7.5 mm. Preferably, at least two of the length, width and height are independently in a range from about 1 mm to about 7.5 mm; more preferably in a range from about 2.5 mm to about 7 mm. More preferably, all three of the length, width and heights are independently within a range from about 1 mm to about 7.5 mm; more preferably in a range from about 2.5 mm to about 7 mm.

Preferably, the activated carbon particle has an ellipsoid shape. For example, the activated carbon material can be a spheroid. In such embodiments, the length, width and height of the activated carbon particle material will be the same or similar.

Preferably, the smallest of the length, width and height of the activated carbon particle is in a range from about 70% to about 99.9% of the largest of the length, width and height of the activated carbon particle. More preferably, the smallest of the length, width and height is in a range from about 80% to about 99.9% of the largest of the length, width and height. Even more preferably, the smallest of the length, width and height is in a range from about 90% to about 99.9% of the largest of the length, width and height.

Preferably filters and smoking articles that include activated carbon particles of the present invention exhibit less particle breakthrough than currently available filters and smoking articles that include activated carbon. For example, filters and smoking articles that include activated carbon particles of the present invention preferably exhibit less particle breakthrough than filters and smoking articles that include coconut shell derived activated carbon having a mesh size of 30-70 and a BET of 1100 $m^2/g$.

Particle breakthrough can be determined by any suitable process. Preferably, particle breakthrough is measured via dry puff (unlit) analysis on a filter containing activated carbon. Particle breakthrough is analyzed when the filter (optionally incorporated into a smoking article) is operably coupled to a smoking machine equipped with a particle counter configured to detect particles in the size range from about 0.3 µm to about 10 µm. Preferably the particle counter is a laser light scattering particle counter, such as AEROTRAK® particle counter. The smoking machine is preferably configured to take 12 puffs of 55 mL during 2 seconds every 13 seconds per filter (optionally incorporated into a smoking article). Preferably, particle breakthrough results are averaged from tests of a number of filters or smoking articles, such as five or ten or more filters or smoking articles.

Filters and smoking articles of the present invention can include activated carbon particles to which one or more sensory enhancing agent is sorbed. The activated carbon particle can thus serve a dual purpose of removing one or more constituents from smoke and delivering the one or more sensory enhancing agent.

One or more sensory enhancing agents can be coated on or sorbed to activated carbon particles in any suitable manner. In some embodiments, a liquid or gaseous composition that includes one or more sensory enhancing agents can be applied to the activated carbon particle. For example, the activated carbon particle can be sprayed with a liquid composition comprising one or more sensory enhancing agents. By way of further example, the activated carbon particle can be dipped in, incubated in, or placed in a stream of, a liquid composition comprising one or more sensory enhancing agents. By way of yet another example, the activated carbon particle can be placed in a stream of, or incubated in a, gaseous composition comprising one or more sensory enhancing agents.

In some embodiments, the liquid composition is applied to activated carbon particles in a fluidized bed. By way of example, activated carbon particles can be introduced into a vessel, a fluidizing gas can also be introduced into the vessel so as to fluidize the activated carbon particles, and a liquid composition comprising one or more sensory agent can be introduced into the vessel while the activated carbon particles are in a fluidized state as described in, for example, International Patent Application WO 03/71886 A1, which is hereby incorporated herein by reference in its entirety to the extent that it does not conflict with the disclosure presented herein. The one or more sensory agents in the liquid composition can adsorb or absorb to the activated carbon particles in the fluidized bed.

In some embodiments, a composition comprising one or more sensory enhancing agents and one or more sensory enhancing agent-holding materials is applied to an activated carbon particle. The one or more sensory enhancing agent-holding materials can include a film forming material and an emulsifying agne as needed. Examples of film forming agents include glucan such as pullulan, maltodextrin and hydroxypropyl cellulose. U.S. Patent Application US 20140123991A1 provides details regarding some suitable methods to apply flavorants and flavorant-holding materials to activated carbon, which methods can be modified and applied to application of sensory enhancing agents to activated carbon particles described in the present disclosure. The disclosure of US 20140123991A1 is hereby incorporated herein by reference in its entirety to the extent that it does not conflict with the disclosure presented herein.

Preferably, the one or more sensory enhancing agent is coated on or sorbed to the activated carbon particle so that the sensory enhancing agent is retained by the particle during storage and is released during smoking of a smoking article that includes the activated carbon particle. European Patent Application EP 263 0 879 A1 discloses cigarettes that include activated carbon having a specific surface area between 1500 $m^2/g$ and 1700 $m^2/g$ and having menthol sorbed at a sorption rate between 80% and 92%, relative to saturation with menthol. EP 263 0 879 A1 discloses that the activated carbon can retain menthol during storage and only releases menthol during passage of tobacco smoke through the menthol-sorbed activated carbon. The disclosure of EP 263 0 879 A1 is hereby incorporated herein by reference in its entirety to the extent that it does not conflict with the disclosure presented herein.

Any suitable sensory-enhancing agent may be coated on or sorbed to an activated carbon particle. Examples of suitable sensory enhancing agents include flavorants, freshening agents, cooling agents, and hot effect agents. Suitable flavorants include aromatic or fragrance molecule as conventionally used in the formulation of flavoring or fragrance compositions. Preferably, the flavorant is an aromatic, terpenic or sesquiterpenic hydrocarbon. The flavorant may be an essential oil, alcohol, aldehyde, phenolic molecule, carboxylic acid in their various forms, aromatic acetal and ether, nitrogenous heterocycle, ketone, sulfide, disulfide and mercaptan which may be aromatic or non-aromatic.

Examples of flavoring agents include natural or synthetic aromas or fragrances. Examples of suitable fragrances are fruity, confectionery, floral, sweet, woody fragrances. Examples of suitable aromas are coconut, vanilla, coffee, chocolate, cinnamon, mint, or roasted or toasted aromas. Suitable freshening agents may be, but are not limited to, menthyl succinate and derivatives thereof. A suitable hot effect agent may be, but is not limited to, vanillyl ethyl ether. In some preferred embodiments, menthol is a sensory enhancing agent that is coated on or sorbed to an activated carbon particle.

The concentration of sensory-enhancing agent coated on or sorbed to an activated carbon particle can be adjusted or modified to provide a desired amount of the sensory-enhancing agent.

In some embodiments, one or more sweeteners are coated on or sorbed to the activated carbon particles. The sweeteners can be applied to the particles in, for example, a solution or suspension in ethanol. Examples of suitable sweeteners include, but are not limited to, sorbitol, aspartame, saccharine, NHDC, sucralose, acesulfame, and neotame.

One or more activated carbon particles may be placed in a smoking article downstream of a smokable material in any suitable manner. The term "downstream" refers to relative positions of elements of the smoking article described in relation to the direction of mainstream smoke as it is drawn from a smokable material and into a user's mouth. Preferably, the one or more activated carbon particles are placed in a filter element.

One or more activated carbon particle may be placed within a void or cavity in the filter. For example, the one or more activated carbon particles may be placed in one or more cavity in a plug-space-plug configuration. The filter may contain a plurality of filter elements into which one or more activated carbon particles may be placed.

Preferably, an activated carbon particle is embedded in filter material, such as cellulose acetate tow. For example, the filter can be embedded in a filter material in a manner similar to how flavor-containing breakable capsules are incorporated into filters of cigarettes.

Preferably, the smoking article or filter element includes only one activated carbon particle.

Preferably, the activated carbon particle has at least two of dimensions, such as width and height, similar to or less than the corresponding dimensions of a filter into which the activated carbon particle is expected to be inserted.

In one preferred embodiment, a filter segment and the activated carbon particle are circular in cross section, the diameter of the filter segment is between about 3.6 mm and about 6.5 mm, and the diameter of the activated carbon particle, measured perpendicular to the longitudinal direction of the filter, is between about 2.5 mm and about 4.5 mm. A filter having a diameter of about 6.1 mm may be used in a "slim cigarette" having an overall diameter of about 7.0 mm.

In another preferred embodiment, the filter segment and the activated carbon particle are circular in cross section, the diameter of the filter segment is between about 3.6 mm and about 5.5 mm, and the diameter of the activated carbon particle, measured perpendicular to the longitudinal direction of the filter, is between about 3.0 mm and about 3.5 mm. A filter having a diameter of less than about 4.5 mm may be used in a "super slim cigarette" having an overall diameter of less than about 5.4 mm.

In another preferred embodiment, the filter segment and the activated carbon particle are circular in cross section, the diameter of the filter segment is between about 3.6 mm and about 4.5 mm, and the diameter of the activated carbon particle, measured perpendicular to the longitudinal direction of the filter, is between about 3.0 mm and about 3.5 mm. A filter having a diameter of about 3.8 mm may be used in a "micro slim cigarette" having an overall diameter of about 4.7 mm.

The term "smoking article" includes cigarettes, cigars, cigarillos and other articles in which a smokable material, such as a tobacco, is lit and combusted to produce smoke. The term "smoking article" also includes articles in which smokable material is not combusted, such as but not limited to smoking articles that heat a smoking composition directly or indirectly, or smoking articles that use air flow or a chemical reaction, with or without a heat source, to deliver nicotine or other materials from the smokable material.

As used herein, the term "smoke" is used to describe an aerosol produced by a smoking article. An aerosol produced by a smoking article may be, for example, smoke produced by combustible smoking articles, such as cigarettes, or aerosols produced by non-combustible smoking articles, such as heated smoking articles or non-heated smoking articles.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Figure 2:
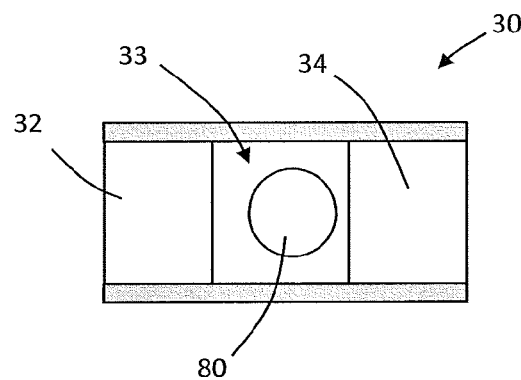
Figure 3:
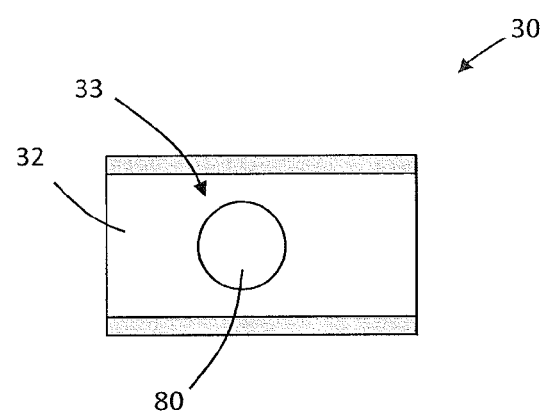

FIG. 1 is a schematic perspective view of an embodiment of a partially unrolled smoking article. FIGS. 2-3 are schematic longitudinal sectional views of embodiments of filters including an activated carbon particle. The smoking articles and filters depicted in FIGS. 1-3 illustrate embodiments of smoking articles or components of smoking articles described above. The schematic drawings are not necessarily to scale and are presented for purposes of illustration and not limitation. The drawings depict one or more aspects described in this disclosure. However, it will be understood that other aspects not depicted in the drawings fall within the scope and spirit of this disclosure.

Referring now to FIG. 1, a smoking article 10, in this case a cigarette, is depicted. The smoking article 10 includes a rod 20, such as a tobacco rod, and a mouth end filter 30 that includes filter material 32, such as cellulose acetate tow. The depicted smoking article 10 includes plug wrap 60, cigarette paper 40, and tipping paper 50. In the depicted embodiment, the plug wrap 60 circumscribes at least a portion of the filter 30. The cigarette paper 40 circumscribes at least a portion of the rod 20. Tipping paper 50 or other suitable wrapper circumscribes the plug wrap 60 and a portion of the cigarette paper 40 as is generally known in the art. The filter 30 includes an activated carbon particle, which may be oriented as depicted in, for example, FIG. 2 and FIG. 3.

FIG. 2 illustrates an embodiment where filter 30 is in a plug 32-space 33-plug 34 configuration. Plug 32 is the mouth end plug and is preferably white cellulose acetate tow. Activated carbon particle 80 is disposed in void space 33 between plugs 32 and 34.

FIG. 3 illustrates an embodiment where filter 30 activated carbon particle 80 is embedded in filter material 32.

In the following non-limiting examples that provide illustrative embodiments of the activated carbon particles and methods described above. These examples are not intended to provide ay limitation on the scope of the disclosure presented herein.

EXAMPLES

A variety of seeds were obtained, carbonized and activated.

Table 1 below presents a summary of the natural sizes of some of the seeds employed.

TABLE 1

Summary of some seeds studied

| Seed | ~Diameter |
|---|---|
| Papaver rhoeas | 1 |
| Amaranthus hypochondriacus | 1 |
| Panicum miliaceum | 2 |
| Sinapis alba | 3 |
| Piper nigrum | 4 |
| Phoenix dactylifera | 5 × 4 |
| Canna indica | 5 |
| Rhamnus alaternus | 6 |
| Osyris lanceolata | 5 |
| Juniperus oxycedrus | 7 |
| Juniperus phoenicea | 6 |
| Schinus molle | 4 |

These natural seeds were dried (for example, in an oven at 110° C. for 3 h) and carbonized to obtain spherical chars (or oval chars, case of the palm tree). For obtaining spherical (or oval) activated carbons, the method used was direct physical activation (e.g., $CO_2$ or steam) of the seeds (one step procedure) or the activation of the spherical biochars (two steps procedure).

As an example, the dried seeds were introduced into a horizontal oven through which nitrogen ($N_2$) was flowed at a rate of 300 ml/min. After purging the oven for a few minutes, seeds were carbonized with a heating rate of 5° C./min to 850° C., and this temperature was maintained for 2 hours. Then, carbonized seeds were weighed to calculate the yield of the charring process. Table 2 below presents humidity percent of the precursor seeds during such drying step, the yields of the carbonization process, and the diameter sizes of the resulting carbonized seeds.

All of the selected seeds maintained their original shapes (spherical or oval), while the sizes of many of the seeds were somewhat reduced after the carbonization process. Interestingly all of the seed chars have suitable mechanical strength, and thus suitable activated carbon particles can be obtained from these seed chars.

TABLE 2

Results of carbonized seeds under the following conditions: 850° C. at 5° C./min for 2 hours under 300 ml/min nitrogen flow

| Seed | Natural humidity (%) | Natural diameter (mm) | Carbonized diameter (mm) | Yield (%) |
|---|---|---|---|---|
| Papaver rhoeas | 5 | 1 | 1 | 22 |
| Amaranthus hypochondriacus | 10 | 1 | 1 | 23 |
| Panicum miliaceum | 11 | 2 | Agglomerated | 23 |
| Sinapis alba | 0 | 3 | 2 | 23 |
| Piper nigrum | 3 | 4 | 3 | 20 |
| Phoenix dactylifera | 15 | 5 × 4 | 4 × 3 | 10 |
| Canna indica | 7 | 5 | 4 | 22 |
| Rhamnus alaternus | 1 | 6 | 4 | 30 |
| Juniperus oxycedrus | 16 | 7 | 5 | 27 |
| Juniperus phoenicea | 45 | 6 | 4 | 26 |
| Schinus molle | 1 | 4 | 3 | 24 |

During the example presented above (heating rate of 5° C./min), it was observed that in some cases (for example, *Panicum miliaceum* seeds) there was some agglomeration of the seeds due to the carbonization process. To prevent such agglomeration of the seeds, a lower heating ramp rate (1° C./min was) used. The seeds did not agglomerate at the reduced heating rate. Table 3 presents results using both heating rates (5° C./min and 1° C./min).

TABLE 3

Results of the carbonized millet seeds at 850° C. for 2 hours with flow rate of nitrogen 300 ml/min but with different heating rate: a) 5° C./min and b) 1° C./min.

| | Natural seeds | Carbonized seeds | |
|---|---|---|---|
| | | 5° C./min | 1° C./min |
| Diameter (mm) | 2 | Agglomerated | 2 |
| Humidity (%) | 15 | — | — |
| Yield (%) | — | 23 | 23 |

Some seeds were directly activated in one step preparation by physical activation ($CO_2$, steam, or $CO_2$ and steam) and some were first charred and then activated in a two steps preparation. As an example, seeds or carbonized seeds were introduced into the oven and were purged under an atmosphere of $CO_2$ with a flow of 80 ml/min. After purging, the oven was heated at a rate of 5° C./min up to at 800° C. This temperature was maintained for a specific time for the activated seeds (between 5 and 30 hours). Finally, the activated seeds were weighed to calculate the activation percentage obtained in each case.

Table 4 shows the activation conditions used for each carbonized seed as well as the information about the resulting diameter sizes and yields of the activation process.

TABLE 4

Results of the activation process of different char seeds

| Seeds | Natural diameter (mm) | Carbonized diameter (mm) | Activated diameter (mm) | Activation time (hours) | Activation (%) |
|---|---|---|---|---|---|
| Sinapis alba | 3 | 2 | 1 | 10 | 30 |

TABLE 4-continued

Results of the activation process of different char seeds

| Seeds | Natural diameter (mm) | Carbonized diameter (mm) | Activated diameter (mm) | Activation time (hours) | Activation (%) |
|---|---|---|---|---|---|
| Phoenix dactylifera | 5 × 4 | 4 × 3 | 3 × 3 | 30 | 30 |
| Rhamnus alaternus | 6 | 4 | 4 | 30 | 26 |
| Canna indica | 5 | 4 | 4 | 5 | 33 |

All the seeds maintained the spherical or ellipsoid morphology having suitable hardness after activation. The conditions for reaching a given activation degree depends on the precursor used.

As an example of the suitability of these seeds to be charred or charred and activated can easily be observed considering than one of these seeds (Canna indica) was charred at a quite high carbonization temperature (900° C.) and activated at 880° C. very quickly (only 3 hours) up to a very high activation degree (89%). Even under these very severe conditions the resulting activated carbons maintain their spherical morphology having a suitable hardness and a very high BET surface area.

The textural characterization of some activated seeds was performed using $N_2$ adsorption at −196° C. and $CO_2$ at 0° C. in a volumetric Autosorb-6B apparatus from Quantachrome. Before analysis, the samples were degassed at 250° C. for 4 h. The BET equation was applied to the nitrogen adsorption isotherm to get the apparent BET surface area. The Dubinin-Radushkevich equation was applied to the nitrogen adsorption isotherm to determine the total micropore volume and to the carbon dioxide adsorption isotherms to determine narrow micropore volumes. Table 5 summarizes some preliminary results of some activated seeds prepared from three different precursors.

TABLE 5

The activation conditions and the textural properties of spherical activated (and oval) carbon prepared from different natural seeds.

| | Activation conditions | | | | Textural properties | | |
|---|---|---|---|---|---|---|---|
| Precursors | $T_{activation}$ (° C.) | Time (h) | Activation (%) | | $S_{BET}$ (m$^2$/g) | $V_{DR}$ ($N_2$) (cm$^3$/g) | $V_{DR}$ ($CO_2$) (cm$^3$/g) |
| Phoenix dactylifera | 800 | 30 | 42 | | 1143 | 0.52 | 0.44 |
| Rhamnus alaternus | 800 | 30 | 26 | | 812 | 0.38 | 0.36 |
| Canna indica | 800 | 5 | 33 | | 856 | 0.39 | 0.35 |
| Canna indica | 880 | 3 | 89 | | 1616 | 0.64 | 0.37 |

The results show that different activation degrees and different surface area can be obtained using different natural seeds. Thus, the selection of the seeds is relevant to obtaining a desired porosity range.

Furthermore, the effects of activation time and activation temperature were studied. BY way of example, studies performed on Rhamnus seeds is presented. Some results obtained are shown in Table 6.

TABLE 6

Activation conditions and textural properties of spherical activated carbon prepared from Rhamnus char using different activation time and temperature

| | Activation conditions | | | | Textural properties | | |
|---|---|---|---|---|---|---|---|
| Precursors | $T_{activation}$ (° C.) | Time (h) | Activation (%) | | $S_{BET}$ (m$^2$/g) | $V_{DR}$ ($N_2$) (cm$^3$/g) | VDR ($CO_2$) (cm$^3$/g) |
| Rhamnus | 800 | 10 | 6 | | 492 | 0.20 | 0.25 |
| Rhamnus | 800 | 30 | 26 | | 812 | 0.38 | 0.36 |
| Rhamnus | 800 | 40 | 33 | | 889 | 0.40 | 0.33 |
| Rhamnus | 850 | 10 | 33 | | 874 | 0.39 | 0.37 |

Different char seeds of Rhamnus were activated using the same activation temperature (800° C.) but varying the activation times (10, 30 and 40 hours). The results show that increasing the activation time increases the activation degree and the surface area. In addition, the activation temperature was increased to 850° C. (setting an activation time of 10 hours) to study the effect of the activation temperature. As expected the results show that higher temperatures produce higher porosity activation using the same activation time.

The surface oxygen concentration of a number of activated carbon particles was tested. For example, temperature-programmed desorption of oxygen on the surface of activated carbon particles derived from Columbian seeds was evaluated. The Columbian seeds were carbonized at 990° C. for 5 hours with a temperature ramp of 10° C. per minute under 100 ml/min $N_2$ (22% yield) and were activated at 880° C. for three hours with a temperature ramp of 10° C. per minute under 80 ml/min $CO_2$ (89% activation).

The samples were characterized as follows. The characterization of all samples was performed using nitrogen ($N_2$) adsorption at −196° C. and $CO_2$ adsorption at 0° C. in a volumetric Autosorb-6B apparatus from Quantachrome. Before the analysis, the samples were outgassed at 250° C. for 4 hours. The BET equation was applied to the nitrogen adsorption data to get the apparent BET surface area (SBET) (Linares-Solano et al., Tanso 1998; 185:316-325). The Dubinin-Radushkevich equation was applied to the nitrogen adsorption data to determine the total micropore volume (pores with size <2 nm) V-DR-N2, and the total pore volume (V N2 at P/P0=0.95). The Dubinin-Radushkevich uation was applied to the carbon dioxide adsorption isotherms to determine narrow micropore volumes V-DR-CO2 (pores with size <0.7 nm).

Surface oxygen content on the surface of the activated carbon can be determined by temperature-programmed desorption (TPD) under standard conditions. The surface oxygen content of the samples was determined as follows. TPD experiments were done in an equipment for differential scanning calorimetry (DSC) and thermo-gravimetric analysis (TGA) (TA Instruments, SDT 2960 Simultaneous) coupled to a mass spectrometer (Balzers, OmniStar) to characterize the oxygen surface chemistry of all the samples, comprising measurement of water, carbon monoxide, carbon dioxide content under an inert atmosphere. See, for example, (i) Roman-Martinez et al. (1993), TPD and TPR characterization of carbonaceous supports and Pt/C catalysts, Carbon 31:894-902; (ii) Otake Y. and Jenkins R. G. (1993), Characterization of oxygen-containing surface complexes created on microporous carbon by air and nitric acid treatment, Carbon 31:109-21; and (iii) Zielge et al. (1996), Surface oxidized carbon fibers: I. Surface structure and chemistry,

*Carbon* 34:983-98. In these experiments, 10 mg of sample were heated up to 950° C. (heating rate 20° C./min) under a helium flow rate of 100 ml/min.

The total oxygen, CO and $CO_2$ adsorption capacity of activated carbon particle derived from Columbian seeds is presented in Table 7 below.

TABLE 7

Adsorption capacity of Columbian seed activated carbon particles

| Sample | CO (μmol/g) | $CO_2$ (μmol/g) | Total O (μmol/g) |
|---|---|---|---|
| Carbonized seed | 195 | 304 | 804 |
| Activated seed | 483 | 927 | 2338 |

We can conclude that by varying the carbonization and activation conditions we can obtain seeds with different textural properties. Therefore, a selection of the natural seed precursor as well as a selection of the charring conditions (heating rate and temperature) and of the activation conditions (temperature and time) allow selection of the properties of the resulting biochar and bioactivated carbon (morphology, size, porosity, surface area and hardness).

Thus, methods, systems, devices, compounds and compositions for ACTIVATED CARBON BEADS FOR SMOKING ARTICLES are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in chemistry; chemical engineering; filter manufacturing; cigarette manufacturing; or related fields are intended to be within the scope of the following claims.

The invention claimed is:

1. A smoking article comprising:
 a smokable material; and
 an activated carbon particle downstream of the smokable material, the activated carbon particle produced from a whole seed without mechanical disruption, wherein the activated carbon particle has a length, width, and height, wherein at least two of the length, the width and the height are independently in a range from 1 mm to 7.5 mm wherein the whole seed is selected from achira seeds, amapola or poppy seeds, amaranto or amaranth seeds, mijo or millet seeds, mostaza or mustard seeds, pimiento Negra or black pepper seeds, palmera or palm seeds, aladierno seeds, bayon seeds, ginebre or juniper seeds, sabina seeds and falsa pimiento or false pepper seeds, or a combination.

2. The smoking article of claim 1, wherein the activated carbon particle is free of binder.

3. The smoking article of claim 1, wherein the activated carbon particle is an ellipsoid.

4. The smoking article of claim 1, wherein the activated carbon particle is a spheroid.

5. The smoking article of claim 1, wherein the activated carbon particle is produced from carbonization and physical activation of the whole seed.

6. The smoking article of claim 1, wherein the seed from which the activated carbon is produced has a diameter in a range from 1 mm to 10 mm.

7. The smoking article of claim 1, wherein the activated carbon particle has a diameter in a range from 2.5 mm to 7 mm.

8. The smoking article of claim 1, wherein the activated carbon particle has a weight in a range from 10 mg to 60 mg.

9. The smoking article of claim 1, wherein the activated carbon particle has a weight in a range from 20 mg to 40 mg.

10. The smoking article of claim 1, wherein the activated carbon particle has a surface area (BET) in a range from 500 $m^2/g$ to 2500 $m^2/g$.

11. The smoking article of claim 1, further comprising a filter having filter material, wherein the activated carbon particle is disposed within the filter material.

12. The smoking article of claim 11, wherein activated carbon in the filter consists essentially of the activated carbon particle.

13. A method for manufacturing a filter for a smoking article, comprising:
 carbonizing and activating a whole seed selected from achira seeds, amapola or poppy seeds, amaranto or amaranth seeds, mijo or millet seeds, mostaza or mustard seeds, pimiento Negra or black pepper seeds, palmera or palm seeds, aladierno seeds, bayon seeds, ginebre or juniper seeds, sabina seeds and falsa pimiento or false pepper seeds, or a combination, the whole seed having a length, width and height, wherein at least two of the length, width and height are independently in a range from 1 mm to 10 mm to form an activated carbon particle from the whole seed without mechanical disruption; and
 incorporating without mechanical disruption the activated carbon particle into the filter.

14. The method of claim 13, wherein the activated carbon particle has a length, width, and height, wherein at least two of the length, the width and the height are independently in a range from 1 mm to 7.5 mm.

15. A method for manufacturing a smoking article, comprising incorporating a filter manufactured according to claim 13 into the smoking article downstream of a smokable material.

* * * * *